(12) United States Patent
Belshan et al.

(10) Patent No.: US 12,372,078 B2
(45) Date of Patent: Jul. 29, 2025

(54) MULTIPLE-VALVE SYSTEM FOR A FLUID PUMP

(71) Applicant: SPM Oil & Gas Inc., Fort Worth, TX (US)

(72) Inventors: Daryl Belshan, Weatherford, TX (US); Ralph Harris, Fort Worth, TX (US); David T. Figgs, Fort Worth, TX (US); Justin Poehls, Glen Rose, TX (US)

(73) Assignee: SPM Oil & Gas Inc., Fort Worth, TX (US)

(*) Notice: Subject to any disclaimer, the term of this patent is extended or adjusted under 35 U.S.C. 154(b) by 29 days.

(21) Appl. No.: 18/188,179

(22) Filed: Mar. 22, 2023

(65) Prior Publication Data

US 2024/0318644 A1 Sep. 26, 2024

(51) Int. Cl.
| | |
|---|---|
| *F04B 7/02* | (2006.01) |
| *F04B 53/10* | (2006.01) |
| *F16K 15/02* | (2006.01) |
| *E21B 43/26* | (2006.01) |

(52) U.S. Cl.
CPC ............ *F04B 7/0225* (2013.01); *F04B 53/10* (2013.01); *F16K 15/025* (2013.01); *E21B 43/26* (2013.01); *E21B 43/2607* (2020.05); *F04B 53/1027* (2013.01)

(58) Field of Classification Search
CPC ........ F16K 1/42; F16K 15/028; F16K 25/005; F16K 15/025; E21B 43/26; F04B 7/0088; F04B 7/0266; F04B 53/1087; F04B 15/02; F04B 53/127; F04B 53/22; F04B 23/06; F04B 7/0225
See application file for complete search history.

(56) References Cited

U.S. PATENT DOCUMENTS

| | | | | |
|---|---|---|---|---|
| 4,878,815 | A | * 11/1989 | Stachowiak | F04B 53/1025 |
| | | | | 417/454 |
| 8,870,554 | B2 | 10/2014 | Kent | |
| 11,225,861 | B1 | * 1/2022 | Dille | F04B 19/22 |
| 11,536,267 | B2 | * 12/2022 | Nowell | F04B 53/22 |
| 11,644,018 | B2 | * 5/2023 | Thomas | F16K 15/063 |
| | | | | 417/567 |
| 2013/0071256 | A1 | * 3/2013 | Kent | F04B 49/10 |
| | | | | 417/1 |
| 2018/0030973 | A1 | * 2/2018 | Bayyouk | F04B 39/122 |
| 2018/0298894 | A1 | * 10/2018 | Wagner | F04B 53/22 |
| 2021/0148385 | A1 | 5/2021 | Brunty et al. | |
| 2021/0301638 | A1 | * 9/2021 | Boyd | E21B 34/16 |

FOREIGN PATENT DOCUMENTS

| | | |
|---|---|---|
| CN | 206929071 U | 1/2018 |
| CN | 209278105 U | 8/2019 |

OTHER PUBLICATIONS

Raw Machine Translation of CN206929071 (U), Junjie et al., "Improved generation fracturing pump valve", 2018.*

* cited by examiner

*Primary Examiner* — Essama Omgba
*Assistant Examiner* — Lilya Pekarskaya

(57) ABSTRACT

A fluid pump may include a fluid chamber, a plunger configured to reciprocate within the fluid chamber, and a valve system including multiple valves. The multiple valves each may be configured to control fluid flow into the fluid chamber or each may be configured to control fluid flow out from the fluid chamber.

20 Claims, 3 Drawing Sheets

MULTIPLE-VALVE SYSTEM FOR A FLUID PUMP

TECHNICAL FIELD

The present disclosure relates generally to fluid pumps and, for example, to a multiple-valve system for a fluid pump.

BACKGROUND

Hydraulic fracturing is a well stimulation technique that typically involves pumping hydraulic fracturing fluid, which may contain proppant, into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids.

A hydraulic fracturing system may employ one or more fluid pumps for pressurizing hydraulic fracturing fluid. A fluid pump has a suction side, at which low-pressure fluid enters the fluid pump via a valve to be pressurized, and a discharge side at which high-pressure fluid pressurized by the fluid pump exits the fluid pump via a valve. To achieve sufficient fluid flow, the valves may have large diameters (e.g., diameters of 4 to 5 inches, or more). However, the force of pressurized fluid upon the valves when closed may produce excessive stress on the valves due to the valves having large diameters. As a result, the valves may wear at a high rate and have a short useful life. Moreover, wear may be exacerbated by proppant that may accumulate between mating surfaces of the valves.

The valve system of the present disclosure solves one or more of the problems set forth above and/or other problems in the art.

SUMMARY

A hydraulic fracturing pump may include a power end and a fluid end. The fluid end may include a fluid chamber in fluid communication with one or more fluid inlets and one or more fluid outlets, a plunger configured to reciprocate within the fluid chamber, and a valve system, in the fluid end, including multiple valves in parallel. The multiple valves each may be configured to control fluid flow through the one or more fluid inlets or through the one or more fluid outlets.

A fluid pump may include a fluid chamber, a plunger configured to reciprocate within the fluid chamber, and a valve system including multiple valves. The multiple valves each may be configured to control fluid flow into the fluid chamber or each may be configured to control fluid flow out from the fluid chamber.

A valve system may include one or more valve seats defining multiple bores, multiple valves configured to sealingly engage the one or more valve seats at respective bores of the multiple bores, one or more biasing elements configured to bias the multiple valves to a closed position with respect to the multiple bores, and one or more retainer elements configured to engage the one or more biasing elements.

DETAILED DESCRIPTION

Figure 1:
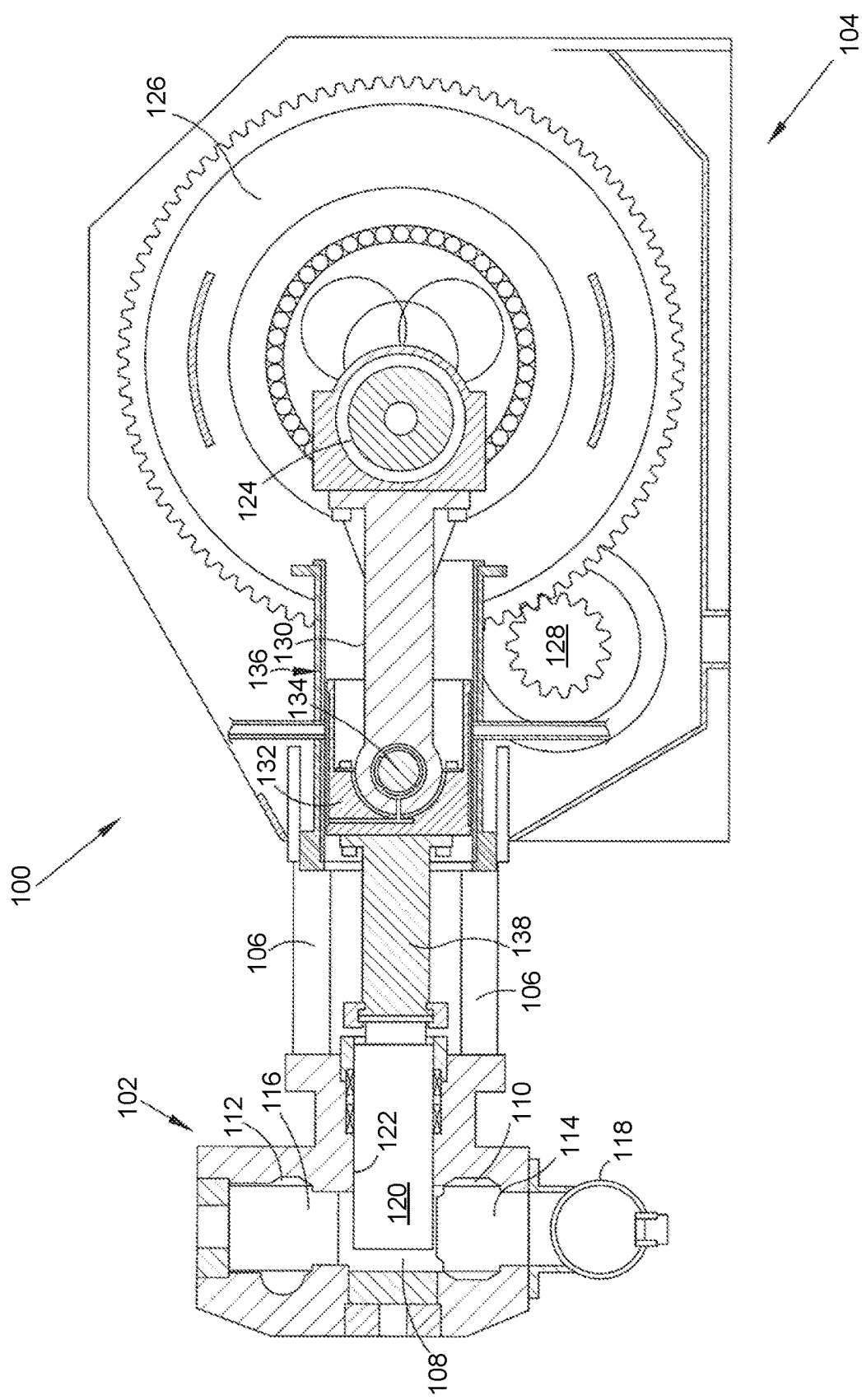
FIG. 1 is a diagram illustrating a sectional view of an example pump assembly.

FIG. 1 is a diagram illustrating a sectional view of an example pump assembly 100 (e.g., for a fluid pump). The pump assembly 100 includes a fluid end 102 and a power end 104. The fluid end 102 may be connected to the power end 104 by stay rods 106. The fluid end 102 includes one or more fluid chambers 108 (only one shown). For example, the pump assembly 100 may include one, two, three, four, five, or more fluid chambers 108 and associated components. In some implementations, the pump assembly 100 may be mounted on a trailer to facilitate transportation of the pump assembly 100 between operational sites. In some implementations, the pump assembly 100 may be a hydraulic fracturing pump. For example, the pump assembly 100 may have a capability to produce a discharge pressure of at least 8,000 psi, at least 10,000 psi, at least 12,000 psi, or at least 15,000 psi.

The fluid chamber 108 may be in fluid communication with one or more fluid passages, such as a fluid inlet 110 (e.g., a suction bore) and a fluid outlet 112 (e.g., a discharge bore). The fluid end 102 may include a suction valve system 114, including at least one suction valve, disposed within the fluid inlet 110 and/or a discharge valve system 116, including at least one discharge valve, disposed within the fluid outlet 112. In some implementations, the suction valve system 114 and/or the discharge valve system 116, rather than being included in the fluid end 102, may be included in a component that is fluidly connected to the fluid end 102 (e.g., fluidly connected to the fluid inlet 110 and/or the fluid outlet 112). Fluid is pressurized to a low pressure, (e.g., 80 psi) by an outside system (e.g., a centrifugal pump) and pushed through a suction manifold 118 through the suction valve system 114 and into the fluid chamber 108. The fluid is then pumped in response to a forward stroke of a plunger 120 and flows through the discharge valve system 116 into the fluid outlet 112. The fluid outlet 112 may be fluidly coupled to a wellbore to supply high pressure fluid to the wellbore for fracturing rock formations and other uses.

In operation, the reciprocating plunger 120 moves in a plunger bore 122 and is driven by the power end 104 of the pump assembly 100. The power end 104 includes a crankshaft 124 that is rotated by a gearbox output 126, illustrated by a single gear but may be more than one gear. A gearbox input 128 is coupled to a transmission (not shown) and a power source (not shown), such as a diesel engine, to rotate the gearbox input 128 during operation. A connecting rod 130 mechanically connects the crankshaft 124 to a crosshead 132 via a wrist pin 134. The crosshead 132 is mounted within a stationary crosshead housing 136, which constrains the crosshead 132 to linear reciprocating movement. A pony rod 138 connects to the crosshead 132 and has its opposite end connected to the plunger 120 to enable reciprocating movement of the plunger 120.

The plunger 120 extends through the plunger bore 122 so as to interface and otherwise extend within the fluid chamber 108. In operation, movement of the crankshaft 124 causes the plunger 120 to reciprocate within, or move linearly toward and away from, the fluid chamber 108. As the plunger 120 translates away from the chamber 108 (a suction stroke of the plunger 120), the pressure of the fluid inside the fluid chamber 108 decreases, which creates a pressure differential across the suction valve system 114. The pressure differential across the suction valve system 114 enables actuation of one or more valves of the suction valve system 114 to allow the fluid to enter the chamber 108 from the suction manifold 118 (e.g., the one or more valves may open responsive to the pressure differential). The pumped fluid is pushed into the fluid chamber 108 as the plunger 120 continues to translate away from the fluid chamber 108. As the plunger 120 changes directions and moves toward the fluid chamber 108 (a discharge stroke of the plunger 120), the fluid pressure inside the chamber 108 increases, which creates a pressure differential across the discharge valve system 116. Fluid pressure inside the chamber 108 continues to increase as the plunger 120 approaches the chamber 108 until the pressure differential across the discharge valve system 116 is great enough to actuate one or more valves of the discharge valve system 116 and enable the fluid to exit the chamber 108 (e.g., the one or more valves may open responsive to the pressure differential).

As indicated above, FIG. 1 is provided as an example. Other examples may differ from what is described with regard to FIG. 1.

Figure 2:
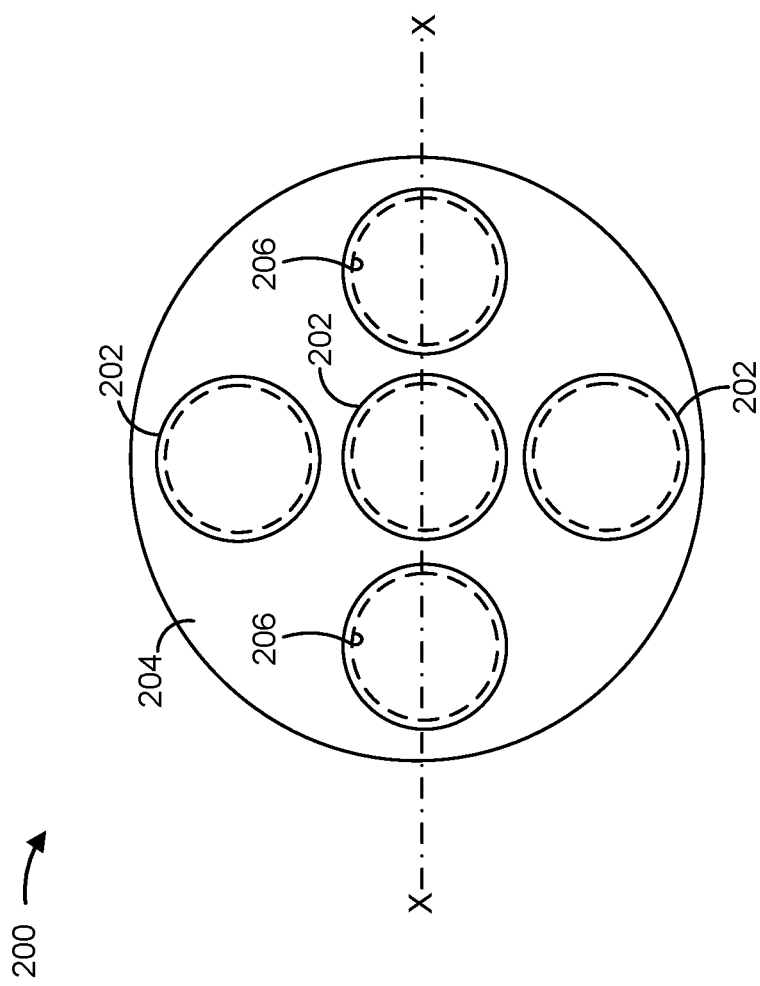
FIG. 2 is a diagram illustrating a top view of an example valve system.

FIG. 2 is a diagram illustrating a top view of an example valve system 200. In particular, FIG. 2 shows valves 202 and a valve seat 204 of the valve system 200. The valve system 200 is a multiple-valve system, as described herein.

The valve system 200 may correspond to the suction valve system 114 and/or the discharge valve system 116, described in connection with FIG. 1. For example, the suction valve system 114 and the discharge valve system 116 may include respective multiple-valve systems, the suction valve system 114 may include a multiple-valve system and the discharge valve system 116 may include only a single valve, or the suction valve system 114 may include only a single valve and the discharge valve system 116 may include a multiple-valve system. As an example, the pump assembly 100 may include a first valve system 200 having multiple first valves 202 and a second valve system 200 having multiple second valves 202. The first valves 202 may be configured to control fluid flow through one or more fluid inlets 110, and the second valves 202 may be configured to control fluid flow through one or more fluid outlets 112.

The valve system 200 may include multiple valves 202. Each of the valves 202 of the valve system 200 may be configured to control fluid flow into the fluid chamber 108, or each of the valves 202 of the valve system 200 may be configured to control fluid flow out from the fluid chamber 108. The valves 202 of the valve system 200 may be configured to control fluid flow in parallel. For example, opening of any one of the valves 202, without opening any other of the valves 202, may cause fluid flow (e.g., continuously, until the valve 202 is closed) into the fluid chamber 108 (e.g., when the valve system 200 corresponds to the suction valve system 114) or may cause fluid flow from the fluid chamber 108 (e.g., when the valve system 200 corresponds to the discharge valve system 116). Moreover, each valve 202 of the valve system 200 may be located and configured so that, when the valve 202 is closed, the valve 202 does not restrict fluid flow through any other valve 202 of the valve system 200 that is open (e.g., fluid flow through any valve 202 of the valve system 200 that is open is unrestricted by any other valve 202 of the valve system 200 that is closed). In other words, the valves 202 are configured to independently control fluid flow into the fluid chamber 108 or out from the fluid chamber 108.

The pump assembly 100 may include one or more fluid inlets 110 and/or one or more fluid outlets 112, and the valves 202 each may be configured to control fluid flow through the one or more fluid inlets 110 or through the one or more fluid outlets 112. In some implementations, the pump assembly 100 may include only a single fluid inlet 110, and the valves 202 each may be configured to control fluid flow through the single fluid inlet 110 (e.g., such that opening of any one of the valves 202 may cause fluid to flow through the fluid inlet 110 into the fluid chamber 108). Alternatively, the pump assembly 100 may include multiple fluid inlets 110, and the valves 202 may be configured to respectively control fluid flow through the multiple fluid inlets 110 (e.g., such that opening of any one of the valves 202 may cause fluid to flow through the corresponding fluid inlet 110 into the fluid chamber 108).

In some implementations, the pump assembly 100 may include only a single fluid outlet 112, and the valves 202 each may be configured to control fluid flow through the single fluid outlet 112 (e.g., such that opening of any one of the valves 202 may cause fluid to flow from the fluid chamber 108 through the fluid outlet 112). Alternatively, the pump assembly 100 may include multiple fluid outlets 112, and the valves 202 may be configured to respectively control fluid flow through the multiple fluid outlets 112 (e.g., such that opening of any one of the valves 202 may cause fluid to flow from the fluid chamber 108 through the corresponding fluid outlet 112).

The valves 202 may be configured such that all of the valves 202 are to open during a single stroke of the plunger 120. For example, as described in connection with FIG. 1, the valves 202 may be configured to open during a suction stroke of the plunger 120 (e.g., when the valve system 200 corresponds to the suction valve system 114), or during a discharge stroke of the plunger 120 (e.g., when the valve system 200 corresponds to the discharge valve system 116), responsive to a pressure differential across the valves 202. The valves 202 may open simultaneously with each other, near-simultaneously with each other, or within a time threshold of each other (e.g., provided that the valves 202 open during a single event associated with a differential pressure change).

The valve system 200 may include the valve seat 204. Multiple bores 206 (shown in dashed lines) may be defined in the valve seat 204. The multiple bores 206 may fluidly connect the fluid chamber 108 with the fluid inlet 110 or the fluid outlet 112. The valve seat 204 may be common to the valves 202 (e.g., the valve system 200 includes only a single valve seat 204). For example, a quantity of the bores 206 may correspond to a quantity of the valves 202. The valves 202, in a closed position, may sealingly engage the valve seat 204 at respective bores 206. In an open position, the multiple valves 202 may disengage the valve seat 204 to allow fluid flow through the bores 206. In some implementations, the valve seat 204 may be tapered inward at openings to the bores 206 where the valves 202 engage the valve seat 204, and the valves 202 may be correspondingly tapered, thereby improving the seals between the valves 202 and the valve seat 204.

In some implementations, the valve system 200 may include multiple valve seats 204. Here, each of the valve seats 204 may include a respective bore 206 to fluidly connect the fluid chamber 108 with the fluid inlet 110 or the fluid outlet 112, in a similar manner as described above. For example, a quantity of the valve seats 204 may correspond to the quantity of the valves 202. Thus, each valve 202, in a closed position, may sealingly engage a respective valve seat 204 at a bore 206 of the valve seat 204, and in an open position, the valve 202 may disengage the valve seat 204, in a similar manner as described above. In some examples, the quantity of the valve seats 204 may be less than the quantity of the valves 202. For example, two or more valves 202 may share a valve seat 204.

The valve system 200 may include two or more valves 202. For example, the valve system 200 may include five valves 202, as shown, less than five valves 202 (e.g., three valves 202 or four valves 202), or more than five valves 202 (e.g., 10 valves 202, 20 valves 202, 50 valves 202, or the like). A valve 202 and/or a corresponding bore 206 may have a diameter less than 4 inches, less than 3 inches, less than 2 inches, less than 1 inch, or less than 0.5 inches. In some examples, valve 202 and/or a corresponding bore 206 may have a diameter of about (e.g., ±10%) 1 inch. The valves 202 (and corresponding bores 206) may have a uniform size or multiple valves 202 (and corresponding bores 206) may have different sizes from each other.

As shown, the valve system 200 may include a central valve 202 and a corresponding central bore 206 in the valve seat 204, and the valve system 200 may include one or more valves 202 and corresponding bores 206 in the valve seat 204 that surround the central valve 202 and the central bore 206 (e.g., in a cross pattern). In some implementations, the central valve 202 and the central bore 206 may be eliminated, and the valve system 200 may include multiple valves 202 and corresponding bores 206 in the valve seat 204 that are arranged nearer to an edge of the valve seat 204 than to a center of the valve seat 204 (e.g., in a circular pattern). In some implementations, the valve system 200 may include valves 202 and corresponding bores 206 in the valve seat 204 that are arranged in a grid pattern, in concentric circles, in a radial pattern, in a triangular pattern, in a polygonal pattern, or in another type of pattern, or in a non-patterned arrangement.

As indicated above, FIG. 2 is provided as an example. Other examples may differ from what is described with regard to FIG. 2.

Figure 3:
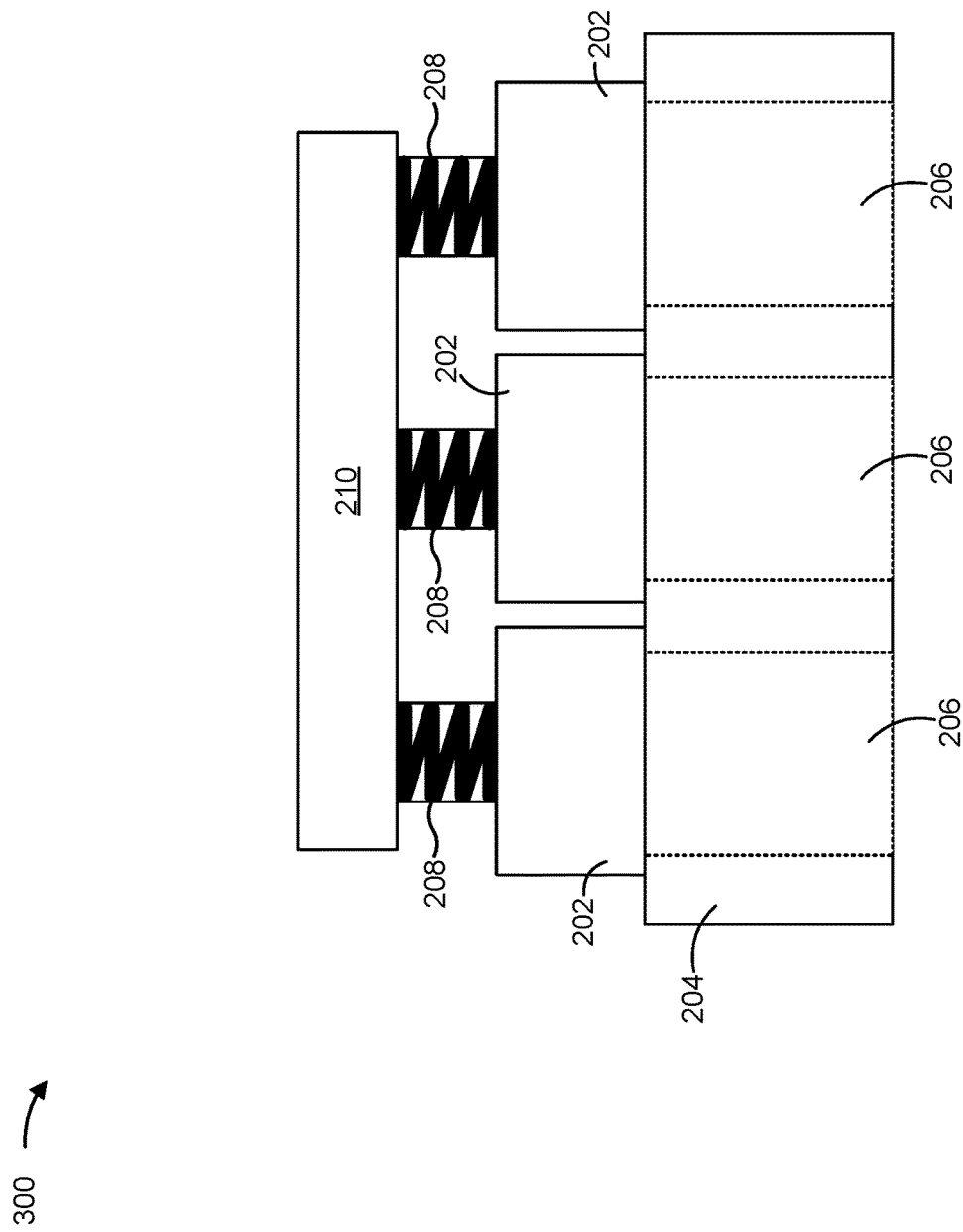
FIG. 3 is a diagram illustrating a cross-sectional view of the valve system of FIG. 2 taken along line X-X.

FIG. 3 is a diagram illustrating a cross-sectional view 300 of the valve system 200 of FIG. 2 taken along line X-X. As shown, the valve system 200 may include multiple biasing elements 208 (e.g., springs, elastomeric bands, or the like). The biasing elements 208 may bias the valves 202 to a closed position with respect to the valve seat 204 (e.g., to prevent fluid flow through the bores 206). For example, a biasing element 208 may include a spring that is engaged with a valve 202 to bias the valve 202 to a closed position against the valve seat 204. A quantity of the multiple biasing elements 208 may correspond to a quantity of the valves 202. Thus, each biasing element 208 may bias a respective valve 202 to a closed position.

In some implementations, the valve system 200 may include only a single biasing element 208 that is configured to bias all of the valves 202 to a closed position. In some examples, the quantity of the biasing elements 208 may be less than the quantity of the valves 202. For example, two or more valves 202 may share a biasing element 208 (e.g., a single biasing element 208 may be configured to bias two or more valves 202 to a closed position). As an example, multiple valves 202 may be connected and configured to actuate as a single unit via a shared biasing element 208.

The valve system 200 may include a retainer element 210 (e.g., a spring retainer). The retainer element 210 may engage and oppose the biasing elements 208 to facilitate biasing of the valves 202 by the biasing elements 208. For example, during opening of a valve 202, a biasing element 208 that is a spring may be compressed between the valve 202 (e.g., a first surface of the valve that is opposite a second surface of the valve 202 that engages the valve seat 204) and the retainer element 210. The retainer element 210 may be common to the biasing elements 208 (e.g., the valve system 200 may include only a single retainer element 210). In some implementations, the valve system 200 may include multiple retainer elements 210. Each of the retainer elements 210 may engage a respective biasing element 208, in a similar manner as described above. For example, a quantity of the retainer elements 210 may correspond to a quantity of the biasing elements 208. In some examples, the quantity of the retainer elements 210 may be less than the quantity of the biasing elements 208. For example, two or more biasing elements 208 may share a retainer element 210.

The valve system 200 may be a unitary part that includes the multiple valves 202. For example, the valves 202 (e.g., along with the valve seat(s) 204, the biasing element(s) 208, and/or the retainer element(s) 210) may share a housing or may be incorporated in a cartridge. The unitary part that includes the valves 202 facilitates installation, replacement, or retrofitting in the pump assembly 100 (e.g., in a bore associated with the fluid inlet 110 or the fluid outlet 112).

As indicated above, FIG. 3 is provided as an example. Other examples may differ from what is described with regard to FIG. 3.

INDUSTRIAL APPLICABILITY

The valve system described herein may be used with any reciprocating displacement pump. For example, a valve system described herein may be used in a fluid inlet of a pump to control fluid flow through the fluid inlet and/or in a fluid outlet of a pump to control fluid flow through the fluid outlet. In some examples, the valve system may be used with a hydraulic fracturing pump that pressurizes fluid for hydraulic fracturing to high pressures (e.g., up to 15,000 psi). Rather than utilizing a single larger-diameter valve to control fluid flow, the valve system includes multiple smaller-diameter valves that are configured to control fluid flow in parallel. The smaller-diameter valves in combination may provide a similar or equivalent flow area as the larger-diameter valve. Compared to the larger-diameter valve, each of the smaller-diameter valves, when closed, may be better able to withstand the force of pressurized fluid without significant stress (e.g., resulting from reduction in the total force being applied, at equal pressure, to each of the smaller-diameter valves). In this way, the smaller-diameter valves may experience reduced wear rates and a longer useful life.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A hydraulic fracturing pump, comprising:
a power end; and
a fluid end, comprising:
 a fluid chamber in fluid communication with one or more fluid inlets and one or more fluid outlets;
 a plunger configured to reciprocate within the fluid chamber; and
 a valve system, in the fluid end, comprising:
  a valve seat defining multiple bores,
  multiple valves wherein each of the multiple valves is configured to control fluid flow through the one or more fluid inlets or through the one or more fluid outlets, and wherein the multiple valves are further configured to sealingly engage the valve seat at respective bores of the multiple bores,
  a plurality of biasing elements configured to respectively bias the multiple valves to a closed position, and
  one or more retainer elements engaged with the plurality of biasing elements,
   wherein a quantity of the one or more retainer elements is less than a quantity of the plurality of biasing elements, and
   wherein the one or more retainer elements comprise a single retainer element that is common with multiple biasing elements of the plurality of biasing elements.

2. The hydraulic fracturing pump of claim 1, wherein the valve system is a first valve system and the multiple valves are multiple first valves configured to control fluid flow through the one or more fluid inlets, and
 wherein the hydraulic fracturing pump further comprises:
  a second valve system comprising multiple second valves configured to control fluid flow through the one or more fluid outlets.

3. The hydraulic fracturing pump of claim 1, wherein the one or more fluid inlets comprise only a single fluid inlet or the one or more fluid outlets comprise only a single fluid outlet, and
 wherein each of the multiple valves is configured to control fluid flow through the single fluid inlet or through the single fluid outlet.

4. The hydraulic fracturing pump of claim 1, wherein the one or more fluid inlets comprise multiple fluid inlets or the one or more fluid outlets comprise multiple fluid outlets, and
 wherein the multiple valves are configured to respectively control fluid flow through the multiple fluid inlets or through the multiple fluid outlets.

5. The hydraulic fracturing pump of claim 1, wherein the multiple valves are configured to open during a suction stroke of the plunger responsive to a pressure differential across the multiple valves.

6. The hydraulic fracturing pump of claim 1, wherein the multiple valves are configured to open during a discharge stroke of the plunger responsive to a pressure differential across the multiple valves.

7. The hydraulic fracturing pump of claim 1, wherein at least a biasing element of the plurality of biasing elements includes a spring that is engaged with a valve, of the multiple valves, to bias the valve to the closed position against the valve seat.

8. A fluid pump, comprising:
a fluid chamber;
a plunger configured to reciprocate within the fluid chamber; and
a valve system comprising:
 one or more valve seats defining multiple bores,
 multiple valves configured to sealingly engage the one or more valve seats at respective bores of the multiple bores, wherein each of the multiple valves is configured to control fluid flow into the fluid chamber or out from the fluid chamber,
 multiple biasing elements configured to respectively bias the multiple valves to a closed position, wherein at least one of the multiple biasing elements is a single biasing element configured to bias two or more valves of the multiple valves to the closed position, and
 a single retainer element configured to engage with each of the multiple biasing elements.

9. The fluid pump of claim 8, wherein the multiple valves are configured to control fluid flow in parallel.

10. The fluid pump of claim 8, wherein the multiple valves are configured such that opening of any one of the multiple valves, without opening any other of the multiple valves, is to cause fluid flow into the fluid chamber or fluid flow out from the fluid chamber.

11. The fluid pump of claim 8, further comprising:
one or more fluid inlets in fluid communication with the fluid chamber; and
one or more fluid outlets in fluid communication with the fluid chamber.

12. A valve system, comprising:
one or more valve seats defining multiple bores;
multiple valves configured to sealingly engage the one or more valve seats at respective bores of the multiple bores;
one or more biasing elements configured to bias the multiple valves to a closed position with respect to the multiple bores; and
one or more retainer elements configured to engage the one or more biasing elements,
 wherein:
  the one or more valve seats comprise multiple valve seats,
  the one or more biasing elements comprise a single biasing element configured to bias two or more valves of the multiple valves, or
  the one or more retainer elements comprise multiple retainer elements.

13. The valve system of claim 12, wherein at least one of:
the one or more valve seats comprise only a single valve seat,
the one or more biasing elements comprise multiple biasing elements, or
the one or more retainer elements comprise only a single retainer element.

14. The valve system of claim 12, wherein the multiple valves are configured to control fluid flow in parallel.

15. The hydraulic fracturing pump of claim 1, wherein the valve system comprises a unitary part comprising the multiple valves.

16. The fluid pump of claim 8, wherein the one or more valve seats comprise a single valve seat defining the multiple bores and being common to the multiple valves.

17. The valve system of claim 12, wherein the one or more biasing elements comprise one or more springs between the multiple valves and the one or more retainer elements.

18. The hydraulic fracturing pump of claim 1, wherein the one or more retainer elements comprise one or more spring retainers.

19. The fluid pump of claim 8, wherein the valve system comprises a unitary part that includes the multiple valves, the multiple biasing elements, and the one or more retainer elements.

20. The valve system of claim 12, further comprising a unitary part that includes the multiple valves, the one or more biasing elements, and the one or more retainer elements.

* * * * *